US011045767B2

(12) United States Patent
Oranth et al.

(10) Patent No.: US 11,045,767 B2
(45) Date of Patent: Jun. 29, 2021

(54) MICRO FLOW FILTRATION SYSTEM AND INTEGRATED MICROFLUIDIC ELEMENT

(71) Applicant: Hoffmann-La Roche Inc., Little Falls, NJ (US)

(72) Inventors: Norbert Oranth, Voerstetten (DE); Nadine Losleben, Mannheim (DE); Sascha Lutz, Neustadt (DE); Adelbert Grossmann, Eglfing (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 243 days.

(21) Appl. No.: 15/962,700

(22) Filed: Apr. 25, 2018

(65) Prior Publication Data

US 2018/0245619 A1 Aug. 30, 2018
US 2020/0149578 A9 May 14, 2020

Related U.S. Application Data

(63) Continuation of application No. 14/386,085, filed as application No. PCT/EP2013/056294 on Mar. 25, 2013, now abandoned.

(30) Foreign Application Priority Data

Mar. 29, 2012 (EP) .................................... 12162011

(51) Int. Cl.
*B01D 63/00* (2006.01)
*B01D 63/08* (2006.01)
(Continued)

(52) U.S. Cl.
CPC ......... *B01D 63/005* (2013.01); *B01D 61/147* (2013.01); *B01D 61/22* (2013.01);
(Continued)

(58) Field of Classification Search
CPC .. B01D 63/005; B01D 63/088; B01D 61/147; B01D 2313/90; B01D 2311/246;
(Continued)

(56) References Cited

U.S. PATENT DOCUMENTS 6,498,353 B2 * 12/2002 Nagle ................... B01L 3/5027
250/216
10,018,547 B2 * 7/2018 Lewis .................... G01N 11/06
(Continued)

FOREIGN PATENT DOCUMENTS

| GB | 2417913 | 3/2006 |
| WO | 2006/26253 | 3/2006 |

OTHER PUBLICATIONS

Guillot et al, "Viscosimeter on a Microfluidic Chip", Langmuir 2006, 22, 6438-6445.*
(Continued)

*Primary Examiner* — Krishnan S Menon

(57) ABSTRACT

A micro fluid filtration system (100) preferably for increasing the concentration of components contained in a fluid sample has a fluid circuitry (1). The fluid circuitry (1) comprises the following elements: A tangential flow filtration element (7) capable for separating the fluid sample into a retentate stream and a permeate stream upon passage of the fluid, an element for pumping (3) for creating and driving a fluid flow through the fluid circuitry (1) and at least one element for obtaining information about the properties of the fluid sample within the circuitry. The circuitry further comprises a plurality of conduits (24) connecting the elements of the fluid circuitry (1) through which a fluid stream of the fluid sample is conducted. The circuitry (1) has a minimal working volume of at most 5 ml, which is the minimal fluid volume retained in the elements and the conduits (24) of the circuitry (1) such that the fluid can be recirculated in the circuitry (1) without pumping air through the circuitry (1).
(Continued)

An integrated microfluidic element (20) of the circuitry (1) contains the functionality of at least two elements of the group of elements of the circuitry (1).

21 Claims, 6 Drawing Sheets

(51) Int. Cl.
    *B01L 3/00*      (2006.01)
    *B29C 45/14*      (2006.01)
    *B29C 70/72*      (2006.01)
    *F16B 33/00*      (2006.01)
    *F16B 35/00*      (2006.01)
    *B01D 61/14*      (2006.01)
    *B01D 61/22*      (2006.01)
    *G01N 1/40*      (2006.01)
    *B29K 105/08*      (2006.01)
    *B29L 31/00*      (2006.01)

(52) U.S. Cl.
CPC ......... *B01D 63/087* (2013.01); *B01D 63/088* (2013.01); *B01L 3/502715* (2013.01); *B01L 3/502753* (2013.01); *B29C 45/14* (2013.01); *B29C 70/72* (2013.01); *F16B 33/004* (2013.01); *F16B 33/006* (2013.01); *F16B 35/00* (2013.01); *B01D 2311/14* (2013.01); *B01D 2311/246* (2013.01); *B01D 2311/25* (2013.01); *B01D 2313/90* (2013.01); *B01D 2315/10* (2013.01); *B01L 2200/0647* (2013.01); *B01L 2200/146* (2013.01); *B01L 2300/0627* (2013.01); *B01L 2300/0681* (2013.01); *B01L 2300/088* (2013.01); *B01L 2300/0816* (2013.01); *B01L 2300/0864* (2013.01); *B01L 2400/0478* (2013.01); *B01L 2400/0487* (2013.01); *B29K 2105/08* (2013.01); *B29L 2031/727* (2013.01); *G01N 2001/4088* (2013.01); *Y10T 403/473* (2015.01); *Y10T 403/56* (2015.01)

(58) Field of Classification Search
CPC ............ B01D 2311/25; B01D 2315/10; B01D 61/22; B01D 2314/14; B29C 45/14; B29C 70/72; F16B 33/004; F16B 33/006; F16B 35/00; Y10T 403/473; Y10T 403/56; B29K 2105/08; B29L 2031/727; B01L 2300/088; B01L 2300/0681; B01L 2400/0487; B01L 2300/0816; B01L 2400/0478; B01L 2300/0627; B01L 2200/146; B01L 3/502753; B01L 3/502715; B01L 2200/0647; B01L 2300/0864; G01N 2001/4088
See application file for complete search history.

(56) References Cited

U.S. PATENT DOCUMENTS

2004/0208751 A1* 10/2004 Lazar .................. F04B 17/00
                                                           417/48
2005/0092662 A1    5/2005   Gilbert et al.
2007/0151924 A1    7/2007   Mir et al.
2009/0101559 A1    4/2009   Bala Subramaniam et al.
2010/0012586 A1* 1/2010   Angelescu ............ B01D 61/18
                                                           210/637

OTHER PUBLICATIONS

Alam, et al., "A continuous membrane microbioreactor system for development of integrated pectin modification and separation processes," Chemical Engineering Journal 167 (2011)418-426.

The International Search Report, dated May 31, 2013, in the corresponding PCT Patent Application PCT/EP13/56294.

The extended European Search Report, dated Aug. 28, 2012, in the related European Patent Application No. 12162011.6.

* cited by examiner

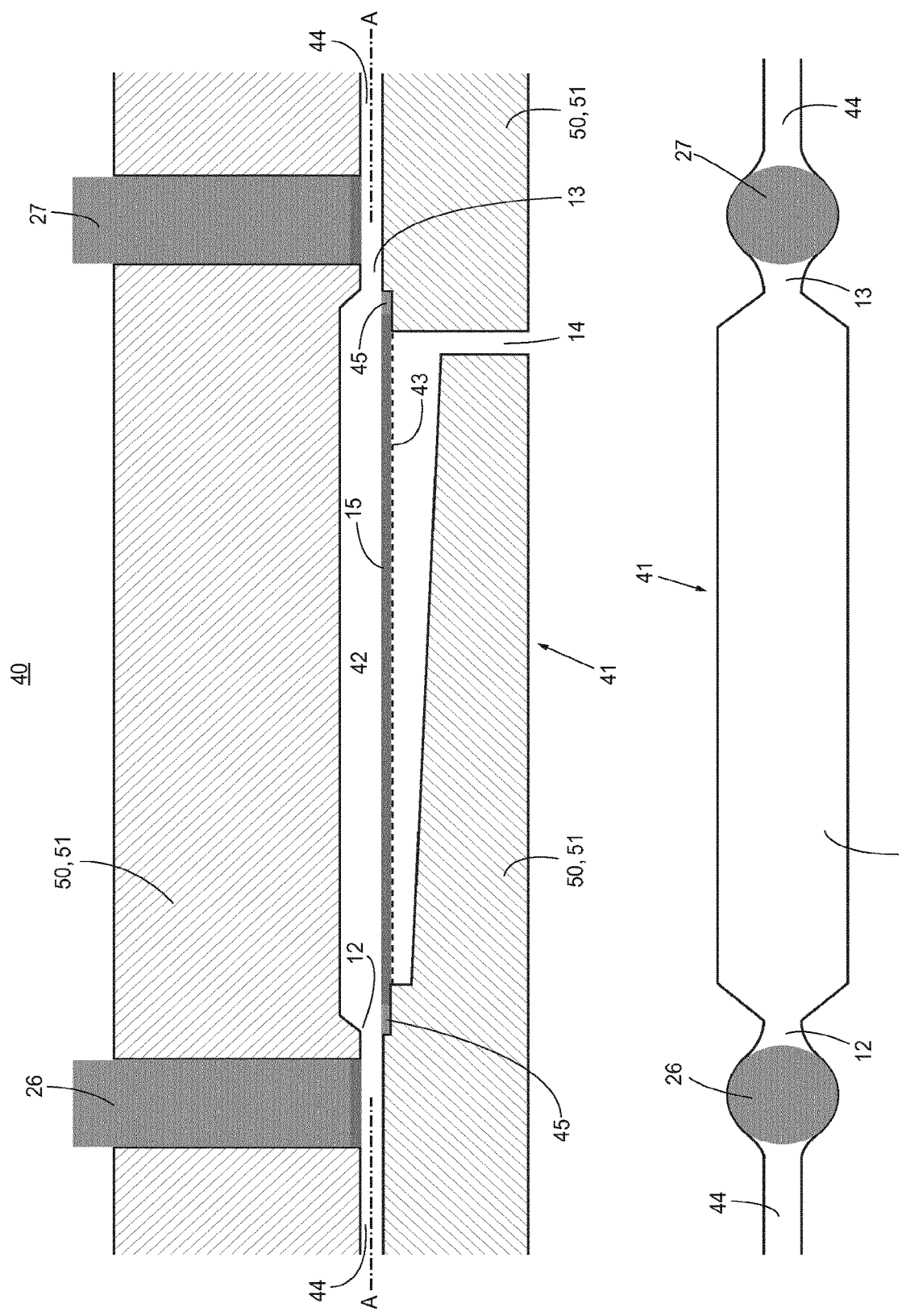

MICRO FLOW FILTRATION SYSTEM AND INTEGRATED MICROFLUIDIC ELEMENT

This application is a Continuation Application of U.S. patent application Ser. No. 14/386,085, filed on Sep. 18, 2014, which claims priority of National Stage Application of PCT/EP2013/056294 filed Mar. 25, 2013, which claims priority from European Patent Application 12162011.6, filed on Mar. 29, 2012; and which are hereby incorporated by-reference in all of their entireties.

The invention relates to a micro flow filtration system preferably for increasing the concentration of a component contained in a small volume fluid sample. The system comprises a micro tangential flow filtration element having a semipermeable membrane capable for separating the fluid sample into a retentate stream and a permeate stream upon passage of the fluid sample. The fluid circuitry further comprises a pumping element, at least one element for obtaining information about the properties of the fluid sample within the circuitry (e.g. two or more pressure sensors for obtaining information about the viscosity of the sample or the determination of the transmembrane pressure or an optical cuvette for obtaining information about the concentration of components of the fluid sample), a plurality of conduits connecting the elements to the circuitry and optionally a flow regulator.

Flow filtration systems for filtrating a fluid sample using a semipermeable membrane for purposes of purification or concentration of components contained in the fluid sample are well known in the state of the art. These systems are used to remove particulate or molecular contaminants in the case of a purification or are used to increase the concentration of a component in a fluid for example for laboratory analysis. Such systems can also be applied to exchange the solvent containing a molecule or particulate of interest by diafiltration. The membrane of such filtration systems can be located in a normal orientation to the flow direction of the fluid sample in a way that the membrane covers the complete diameter of the flow channel which is characterized as a normal flow filtration or dead-end filtration, or the membrane surface can be located essentially parallel to the flow of the liquid sample which is known as tangential flow filtration system (TFF-system).

Tangential flow filtration systems have the advantage that due to the direction of the flow of the sample which is essentially parallel to the membrane surface an automatically sweeping and cleansing takes place so that often higher fluxes and higher throughputs can be attained with such systems in relation to corresponding normal flow filtration systems. Further, a large fraction of sample flows continuously over the membrane surface so that a clogging, fouling, or a concentration polarization is discouraged in such systems. With respect to these and other advantages tangential flow filtration systems (TFF-system) are often used in biotechnological and drug manufacturing processes.

During the passage of the fluid through the tangential flow filtration element having a semipermeable membrane the components of the solution that are smaller than the pore size of the membrane flow through the membrane as permeate stream while larger components are retained in a retentate stream. The retentate stream is recirculated in the flow circuitry and is pumped across the membrane again in a continuous fashion. Such TFF-systems are used to significantly reduce the volume of the sample solution as a permeate stream is withdrawn from the system. So, the sample solution becomes concentrated when the system is driven in a concentration mode.

In other applications, the separation of two or more components in the solution such as a buffer has to be performed. Therefore, an exchange buffer solution (diafiltrate solution) typically but not obligatory not containing the component to be separated is added to the system so that one component is withdrawn as permeate stream and exchanged by another component, i.e. by the exchange buffer solution, so that in the end, for example, one buffer is exchanged by another buffer. A diafiltration mode and a concentration mode can be performed in the same system using special control strategies.

The document WO 2006/026253 A2 describes a tangential flow filtration (TFF) process development device to transfer the results of a lab-scale TFF-system to an industrial-production-scale-system. The information and data relevant for "scaling up" to industrial scale processes are collected automatically. Therefore, a fully automated TFF-system is provided capable of concentrating 0.5 l to 5 l batches of a reservoir to a minimum volume of approximately 20 ml or less than 20 ml. So, the minimal recirculation volume (also called minimal working volume) of the system is approximately 20 ml (or a little less). To achieve such minimal recirculation volume a special tank for storing the fluid is used.

The tank for housing the reservoir has a mixing zone located at a downstream end of the reservoir. The inlet and outlet of the tank are positioned in the mixing zone to enable a resulting volume for the concentrate of about 20 ml. Although the reservoir's inlet and outlet is positioned at the bottom of the tank, the minimal value of the minimal recirculation volume is restricted to approximately 20 ml or a little less due to the relatively large scale of the tank with a maximum volume of 0.5 l to 2 l or 5 l. The minimum recirculation volume is in the range of 20 ml and may be reduced to approximately 15 ml or 10 ml with such a system but not to a lower value. So, the proposed system can not be used or optimized to receive an end volume of the concentrated solution of less than 10 ml at the end of the concentration process.

Tangential flow filtration systems are often used in production processes of substances useful for biotechnological, chemical, therapeutical or diagnostic applications to increase the concentration of these desired substances. Because the start materials and solutions used in these production processes are often expensive and rare, in advance to the industrial scale process a lab-scale filtration process is installed using only small amounts and volumes of the solution and the samples. This is especially important if the components are proteins or the like which are sensitive of damages due to shear forces and other forces existing in large-scale devices. For example biotechnologically produced proteins which have to be concentrated in a solution are extremely costly and on the other side extremely sensitive of damages due to the forces which arises in industrial scale process devices. Therefore, the risk to concentrate such proteins in a solution in industrial scale devices is high. Further, these proteins are often not available in a larger amount.

So, there is a strong demand in the industrial process development for a flow filtration device being able to concentrate a component of a solution preferably by the factor of more than 10 and using a start volume that is at most 20 ml.

It is an object of the invention to provide an optimized TFF-system being able to handle a start volume of a solution of at most 20 ml, preferably at most 10 ml, and to concentrate the components of the solution. The resulting volume of the concentrated solution at the end of the concentration process should preferably be at most 2 ml, particularly preferably at most 1 ml, particularly preferably at most 100 µl. The filtration process should be fast and economical, repeatable and accurate.

The problem is solved with a microfluidic flow filtration system for increasing the concentration of components contained in a fluid sample with the features according to claim 1. The object is also solved with an integrated microfluidic element according to claim 11.

The micro flow filtration system according to the invention for increasing the concentration of components contained in a fluid sample has a fluid circuitry in form of a loop in which the fluid sample or solution is recirculated. The fluid circuitry comprises a tangential flow filtration element (TFF-element), an element for pumping which is suitable for increasing and driving a fluid flow of the fluid sample through the fluid circuitry and through the tangential flow filtration element, at least two elements for obtaining information about the properties of the fluid sample within the circuitry, and a plurality of conduits connecting the elements to the fluid circuitry through which the fluid stream of the fluid sample is conducted. Optionally, the fluid circuitry comprises also a regulator element for regulation the pressure and/or the flow in the circuitry.

The fluid circuitry has a minimal working volume which is also called minimal recirculation volume. This volume is the amount of fluid which has to be retained in the fluid circuitry such that the fluid can be recirculated in the circuitry without pumping air through the circuitry. In other words, the elements of the fluid circuitry and the conduits connecting these elements have to be filled with a fluid in such a manner that a continuous fluid flow in the circuitry can be arranged. The minimal working volume depends on the elements used in the circuitry. For example, if tubings for transporting the fluid are installed in the circuitry, these tubings have also a non-negligible contribution to the minimal working volume. The minimal working volume of the circuitry of the micro fluid filtration system according to the invention is at most 5 ml. Preferably, the minimal working volume of the circuitry is even smaller, e.g. preferably at most 2 ml, further preferably at most 1 ml, particularly preferably at most 100 µl.

According to the invention the fluid circuitry contains also an integrated microfluidic element in which the functionality of at least two elements of the group of elements of the circuitry is integrated. So, the integrated microfluidic element is an element or a component of the circuitry in which the function of at least two of the above mentioned elements of the circuitry is implemented. So, instead of the two separate elements, which are substituted, only one integrated microfluidic element is arranged in the circuitry. Preferably, the integrated microfluidic element is arranged in the retentate circuitry of the fluid circuitry and not in the permeate circuitry. Especially in a concentration mode such positioning of the microfluidic element is advantageous because the functionality of two elements of the circuitry is provided in only one element and the working volume of the system is decreased or reduced.

The integrated microfluidic element defines a volume element having a volume. So, a discrete volume can be assigned to the integrated microfluidic element. The volume of the element is not larger than one fourth of the minimal working volume of the fluid circuitry. In a preferred embodiment this sub-volume of the integrated microfluidic element is at most 20% of the working volume of the fluid circuitry, preferably at most 15% and further preferably at most 10%.

The smaller the sub-volume of the integrated microfluidic element is, the smaller is the influence to the total working volume of the system which means to the total working volume of the fluid circuitry. In a preferred embodiment the volume of the integrated microfluidic element (sub-volume) is at least 500 µl, preferably at most 200 µl.

This has the advantage that the integrated microfluidic element can be of a smaller size than the two substituted elements. The integrated microfluidic element has a volume that is smaller than the volume of the two substituted elements together with the conduits connecting these elements. So, the contribution of the integrated microfluidic element to the minimal working volume is sufficiently smaller than the contribution of two separate elements of the fluidic circuitry and the conduit connecting these elements. Especially the fact that the connecting conduit and the substituted elements have to be connected together increases the contribution to the minimal working volume because also the fittings and tubings or fluidic channels to connect the conduit to the elements play a non-negligible role.

So, using an integrated microfluidic element allows combining the functionality of two elements in one volume element. This has a positive influence to the minimal working volume which is reduced. Even very small amounts of fluid (less than 15 ml, preferably less than 5 ml) can be processed in the flow filtration system wherein in a concentration mode the concentration of the fluid can be raised by the factor of 100 and more.

In a preferred embodiment of the microfluidic filtration system the circuitry further comprises a reservoir element suitable for containing a fluid wherein the reservoir element is integrated into the fluid circuitry loop. The reservoir element has a reservoir inlet and a reservoir outlet both in connection to the circuitry. Preferably the inlet and the outlet of the reservoir are arranged at the bottom of the reservoir which can also be a tank or the like. This assures that the contribution of the reservoir to the minimal working volume of the circuitry is relatively small.

Preferably the volume of the reservoir is at most 20 ml, in particular at most 10 ml. During the invention it was recognized that the size of the reservoir can be further reduced to a maximum volume of the reservoir of 5 ml. In a preferred embodiment the reservoir has a volume of at most 2 ml, very preferably of at most 1 ml. If very small solution volumes have to be processed the volume of the reservoir can be further reduced to a volume of at most 0.7 ml or preferably of at most 0.5 ml. Especially if fluid batches of approximately 0.5 ml or less have to be processed in the microfluidic filtration system, the integration of the functionality of at least two elements of the circuitry into an integrated microfluidic element plays an important role.

In a preferred embodiment the circuitry of the filtration system comprises an optical measuring element for obtaining information about the concentration of components contained in the fluid solution. This optical measuring element preferably comprises a cuvette or the like through which the fluid sample flows during the concentration process and which is transparent in such a manner that an optical measuring of parameters related to the concentration of one or more components contained in the fluid solution can be performed.

In another preferred embodiment the circuitry comprises a measuring element for obtaining information about the viscosity of the fluid sample and/or at least a valve element and/or a capillary channel element and/or a hollow fiber element wherein these elements are also members of the group of the elements of the circuitry. The measuring element for obtaining information about the viscosity of the fluid sample usually consists of at least two pressure sensors whose results can be used to determine the viscosity of the fluid sample using the Hagen-Poiseuille equation. During the development of the invention investigations have been performed which show that there is a linear dependency between the pressure difference at two points in the fluid circuitry and the viscosity of the solution flowing through the circuitry.

The tangential flow filtration element of the circuitry comprises a feed inlet, a retentate outlet, a permeate outlet and a semipermeable membrane which is capable of separating the fluid sample into a retentate stream and a permeate stream upon passage of the fluid sample into the tangential flow filtration element through the feed inlet. For the concentration process tangential flow filtration elements can be used which are commercially available from a couple of manufacturers. An important criterion for choosing a fluid filtration element for a microfluidic flow filtration system to process even small volumes of a solution is the contribution of the tangential flow filtration element to the minimal working volume. So, the surface area of the membrane and the volume of the tangential flow filtration element are important. The contribution to the minimal working volume of the flow filtration element should be as small as possible, preferably the minimal working volume of the TFF-element should be at most 1000 µl, preferably at most 500 µl or further preferably at most 100 µl, particularly preferably at most 20 µl.

It is quite clear for a person skilled in the art that the element for pumping is a pump which is integrated in the circuitry. Here the known pumps can be used. For example, the pumping element can comprise a syringe or two or more syringes to assure a continuous flow of the fluid through the circuitry, alternatively piston pumps or peristaltic pumps or gear pumps can be used.

Preferably the element for obtaining information about the properties of the fluid is an element for obtaining information about the pressure and the flow within the circuitry particularly preferably one or more pressure sensors.

Preferably, also one or more regulator elements for regulating the flow through the circuitry are integrated within the circuitry. Such regulator elements can be valves, adjustable pumping elements, and/or pressure regulators or the like.

In a preferred embodiment the microfluidic flow filtration system is used for solutions in which the contained component is protein. Especially in the field of research where only small amounts of the components contained in the fluid are available for e.g. process development purposes, there is a need for an improved TFF system to perform e.g. concentration experiments with very small amounts of these compounds (e.g. less than 100 or even less than 20 mg) under conditions resembling the technical process conditions with regard to e.g. mechanical stress. Although in some cases it is possible to supply such proteins in a sufficiently large amount such production requires a large effort of time and materials and leads to an extraordinary expense.

It is known that the concentration factor depends on the ratio of the sample volume and the minimal working volume of the circuitry or the microfluidic flow filtration system. So, if only a small amount of fluid sample is available and the desired concentration factor is in range of 2 to 100 or more, the minimal working volume of the circuitry has to be significantly reduced. Preferably the minimal working volume is at most 1 ml, further preferably at most 500 µl. In some cases the minimal working volume of the circuitry is at most 200 µl, particularly preferably at most 100 µl. Particularly, if the concentration factor is determined to be more than 50, the small amounts of the minimal working volume as mentioned before are preferred.

In a preferred embodiment the working volume of the circuitry without the reservoir is of special interest. Preferably this minimal working volume should be at most 900 µl, further preferably at most 500 µl and also further preferably at most 350 µl. Particularly preferably is a minimal working volume of the circuitry of at most 200 µl, 150 µl, 120 µl, 100 µl or 90 µl. Such small minimal working volume is preferred if the predetermined concentration ratio is more than 50 or 100.

To arrange a micro flow filtration system with small minimal working volume the internal diameter of the conduits used in the circuitry is at most 1.5 mm, preferably at most 1 mm. For minimal working volumes of less than 200 µl conduits which have an internal diameter of at most 0.7 mm or particularly preferably of at most 0.3 mm are used. The conduits are preferably channels or passages in an element of the circuitry. They can also be a pipe or a tubing. These conduits connect the integrated microfluidic element of the circuitry with the other elements of the circuitry. Therefore, a rigid pipe as a conduit can be used.

In a preferred embodiment of the flow filtration system according to the invention the system comprises a second reservoir which is located outside the circuitry but which is in fluid connection with the circuitry. The second reservoir has a volume which is substantially larger than the volume of the circuitry itself or of a first reservoir element in the circuitry if present. So, the second external reservoir would be the main reservoir for the fluid solution containing the component to be concentrated. Preferably this second reservoir outside the circuitry has a volume which is at least 10 times larger than the volume of the reservoir element of the circuitry or of the circuitry itself, particularly preferably at least 20 times larger.

The system according to the invention can be used for concentrating a component contained in a fluid sample like a protein or a molecule or the like. Optionally the system can also be used in a diafiltration mode. In this case the external second reservoir contains a solution with a buffer that should be used to exchange a buffer in the solution contained in the circuitry which also contains the desired component. So, an exchange of the buffer can easily be performed. It is evident that a diafiltration mode can also be supplied using only one reservoir in the circuitry. In such case, the circuitry is filled with the fluid sample and the reservoir is filled with the buffer solution.

In the field of biotechnology and process technology there are a lot of applications which require the determination of the concentration of components of the fluid sample, the formation of aggregates within the fluid sample and the viscosity of the fluid sample using a flow through method. A typical example is the requirement that the concentration of proteins contained in the fluid sample should be measured online during the concentration process. So, the actual fluid parameters, i.e. viscosity, concentration, and aggregate formation have to be determined during the process. Based on these online-measured parameters, the system can be controlled respectively. Essential process parameters for the concentration and purification process will change during the process. This leads to the resulting knowledge that the concentration and the rate of aggregate formation of the proteins and the viscosity of the solution have to be measured in real time so that an optimal concentration process can be performed by adjusting the relevant process parameters.

In the development of the subject matter of the invention it has been identified that for the determination of the concentration using photometric methods can be applied. For this photometry technique preferably a cuvette is used through which the fluid sample flows without diluting the sample. For an optical measurement of the absorption a light source is used which is transmitting light through the cuvette. In a preferred embodiment light crosses the cuvette perpendicular to the flow direction. Performing the photometric measurement using the cuvette preferably an ultra-violet radiation is used to determine the concentration of compounds contained in the sample (e.g. of proteins). For this online determination of the concentration good results could be achieved using a radiation of light with a wave length of 280 nm±10 nm.

For measuring the appearance of aggregates in the sample fluid, the ratio between the absorption values at the wave-length of 280±10 nm and at a wave length larger than 290 nm (e.g. 320-330 nm) is preferred.

In addition, the viscosity of the fluid sample can be measured using a pressure sensing element comprising two pressure sensors at the inlet and at the outlet of the capillary, respectively. These pressure sensors detect a difference of pressures between the pressure sensor at the inlet and the pressure sensor at the outlet during the flow of the sample through the cuvette. This measurement is performed using a known geometry of the cuvette and a predetermined (constant) flux or flow through rate. Based on the change of the pressure during the flow through the cuvette, the viscosity of the fluid sample can be calculated based on well-known equations like the Hagen-Poiseuille equation. The viscosity is proportional to the measured pressure difference.

In a preferred embodiment, the integrated microfluidic element according to the invention comprises and combines these two functionalities of the two pressure sensors and the cuvette. So, the integrated microfluidic element can be used to determine the viscosity, the concentration of the compound, and the formation of aggregates in the fluid sample in real time and online in one element. In addition to this advantage the minimal working volume of this integrated microfluidic element is substantially smaller than using three separate components and conduits for connecting these components.

In the context of the invention it was recognized that measuring the viscosity and the concentration of the sample fluid in the fluidic circuitry in parallel and within the same microfluidic element leads to a couple of difficulties. To determine the viscosity a pressure drop along a capillary has to be detected. In typical lab-scale systems or industrial-production-scale-systems such measurements are not possible due to the large volumes of the fluid samples to be transported through the fluidic system and due to the large diameters of the tubes and fluid conduits. So, the overall pressure and the pressure differences within such systems are too low to allow a precise viscosity determination based on pressure drop measurements. During the invention it was recognized that for a precise viscosity measurement the capillary has to be very small in diameter (smaller than 0.5 mm) and preferably with a relatively short length (less than 200 mm), as the diameter has the largest influence on the pressure drop. Therefore, variances in the channel diameter have a significant impact on the precision of the measurement of the pressure drop. To determine a high variation of the viscosity a high pressure range must be handled in the system. Typical pressures that occur in such channels are in the range of 100.000 Pa to 500.000 Pa, preferably up to 1.000.000 Pa. Therefore, the channel has to be stable with respect to high pressures. So, the material of the channel, which is preferably a capillary, is preferably metal. Investigations of the inventors have shown that also glass is a suitable material for this purpose, especially if the walls of the glass channels have a sufficient thickness. Fluidic channels made of glass, like it is used for cuvettes for example, can be produced with a very high precision and therefore reduce variances in the channel diameter which is positive with respect to the pressure measurement.

On the other hand the relatively small diameter shows additional advantages for the optical measurement in a transparent capillary when measuring the concentration. Especially in the case of high concentrations to be determined the small diameters have a positive effect because the optical density of the sample significantly increases with increasing sample concentrations. This causes high absorption values that are very complicated to be measured. To reduce the absorption measured through the channel or cuvette and to simplify the absorption measurement, the optical path length of the light beam passing through the sample have to be reduced. The reduction of the cuvettes diameter reduces the optical path length and therefore reduces the absorption to be measured. Therefore, a suitable material for a transparent channel or capillary is glass. To fulfill the requirements regarding the pressure in the channel or capillary with respect to the viscosity measurement, the walls have to have a sufficient thickness to be stable enough. Despite the thickness of the walls an optical measurement of the concentration remains possible with a reduced optical path length.

Although channels with small diameters tends to be blocked or clogged by aggregates typically formed in filtration processed it was realized that a transparent channel made of glass having a small diameter can be used for measuring the viscosity via pressure drop measurement and for optically measuring the concentration in the sample. So, such transparent capillary, in combination with the two pressure sensors, can be used in an integrated microfluidic element.

In another alternative or cumulative preferred embodiment, the integrated microfluidic element according to the invention comprises and combines the functionality of the micro tangential flow filtration element (TFF-element) and at least one element for obtaining information about the properties of the fluid sample within the circuitry. Preferably, elements for obtaining information about the properties of the fluid sample within the circuitry are pressure sensors to measure the pressure of the fluid sample in the circuitry and, based thereon, can be used to determine the viscosity of the fluid sample. So, in this preferred embodiment a micro TFF-element is combined with at least one pressure sensor, further preferred with two pressure sensors.

Preferably the TFF-element comprises a TFF-housing which can be a filter cassette. The TFF-housing is part of the housing of the integrated microfluidic element. In this case the TFF-housing is integrated in the housing of the microfluidic element. Preferably the membrane of the TFF-element is disposable. The membrane can be exchanged in the case that the membrane is clogged-up. If the efficiency of the TFF-element is dropped to a predetermined threshold value an exchange of the membrane becomes necessary. To design the TFF-element with a disposable membrane has the advantage that the filter cassette itself (TFF-housing) can remain unchanged in the fluid circuitry so that the connections to the connected conduits do not have to be touched especially not to be opened. Further, if the TFF-element is integrated in the microfluidic element together with two pressure sensors, the sensors remain at their location, especially in their position in the housing of the microfluidic element. So, neither the sensors themselves nor their electrical connections are influenced if only the membrane of the TFF-element is exchanged in case of clogging. Further the size and especially the volume of the fluidic channels of a TFF-element comprising pressure sensors can be reduced because the channels connecting the filter cassette and the pressure sensors can be short.

In a further preferred embodiment this integrated microfluidic element also contains the functionality of the pressure regulator element so that in addition the pressure in the circuitry can be controlled and adjusted. So, not only the functionality of two elements is integrated within the integrated microfluidic element according to the invention, but the functionality of three (or even more) elements.

In another preferred embodiment of the integrated microfluidic element according to the invention, it comprises the functionality of a capillary or a capillary channel and of the two pressure sensors.

The invention is illustrated in more detail hereafter based on particular embodiments shown in the figures. The technical features shown therein can be used individually or in combination to create preferred embodiments of the invention. The described embodiments do not represent any limitation of the invention defined in its generality.

FIG. 5a, b shows two embodiments of another microfluidic element comprising the functionality of measuring the pressure in the circuitry and filtering the fluid sample.

Figure 1:
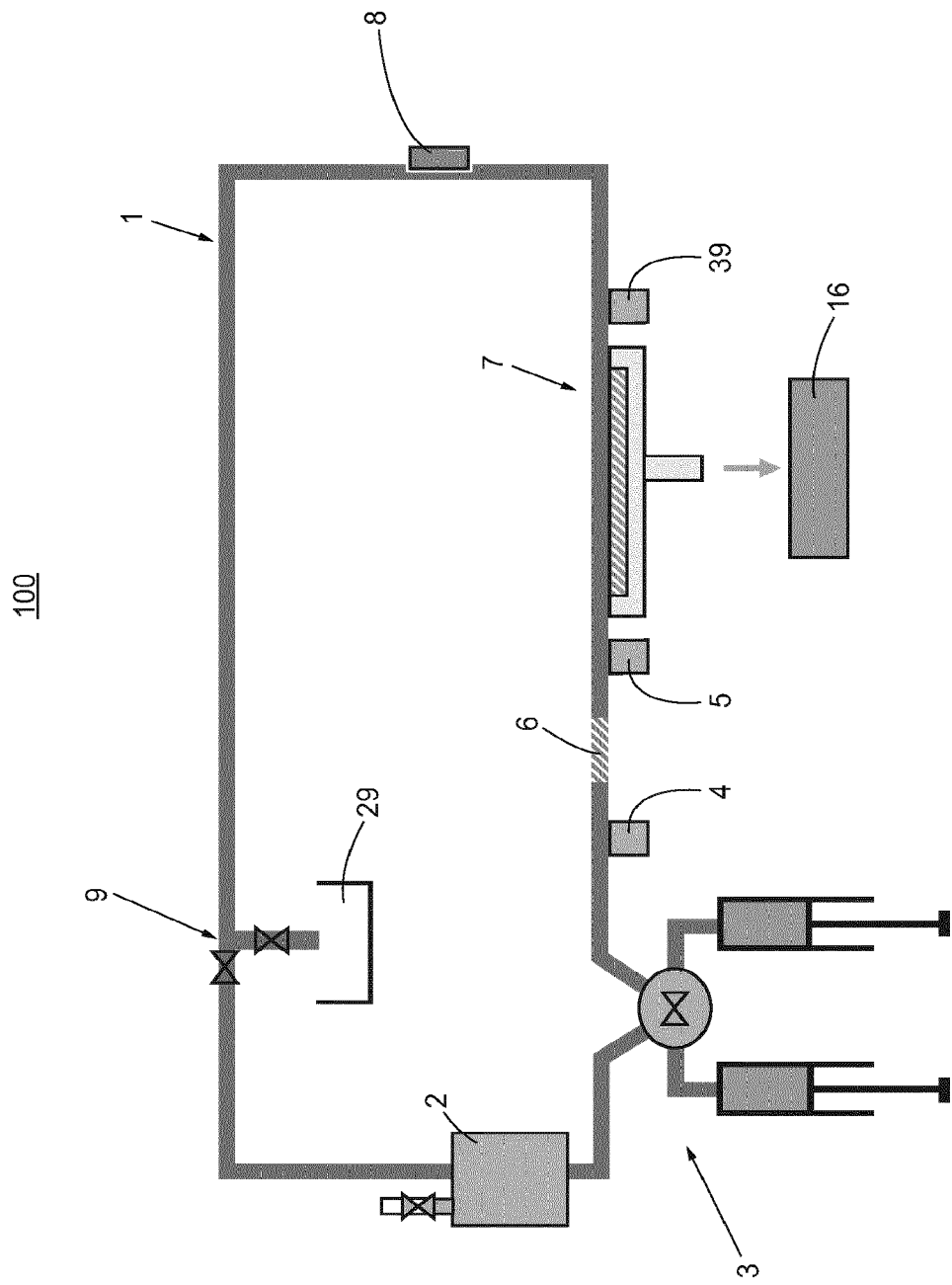
FIG. 1 shows a schematic view of a filtration system.

FIG. 1 shows a state-of-the-art microfluidic flow filtration system 100 having a circuitry 1. The circuitry 1 comprises a reservoir element which is a reservoir 2, a container or a tank containing the fluid sample, an element for pumping which is a pump 3, three pressure sensors 4, 5, 39, a cuvette 6, a tangential flow filtration element 7, a pressure regulator 8 and a valve 9 which is a T-shaped conjunction to withdraw fluid from the circuitry 1. Each functionality of the circuitry 1 is implemented by one single element like the reservoir 2, the pressure sensors 4, 5 or 39 or the cuvette 6. Because each of the elements and also the conduits connecting these elements have a contribution to the minimal working volume of the circuitry, the minimal working volume is relatively large. In the state of the art the minimal working volume of the fluid circuitry 1 is at least approximately 20 ml. Normally the minimal working volume is in the range of some 100 ml.

Figure 2:
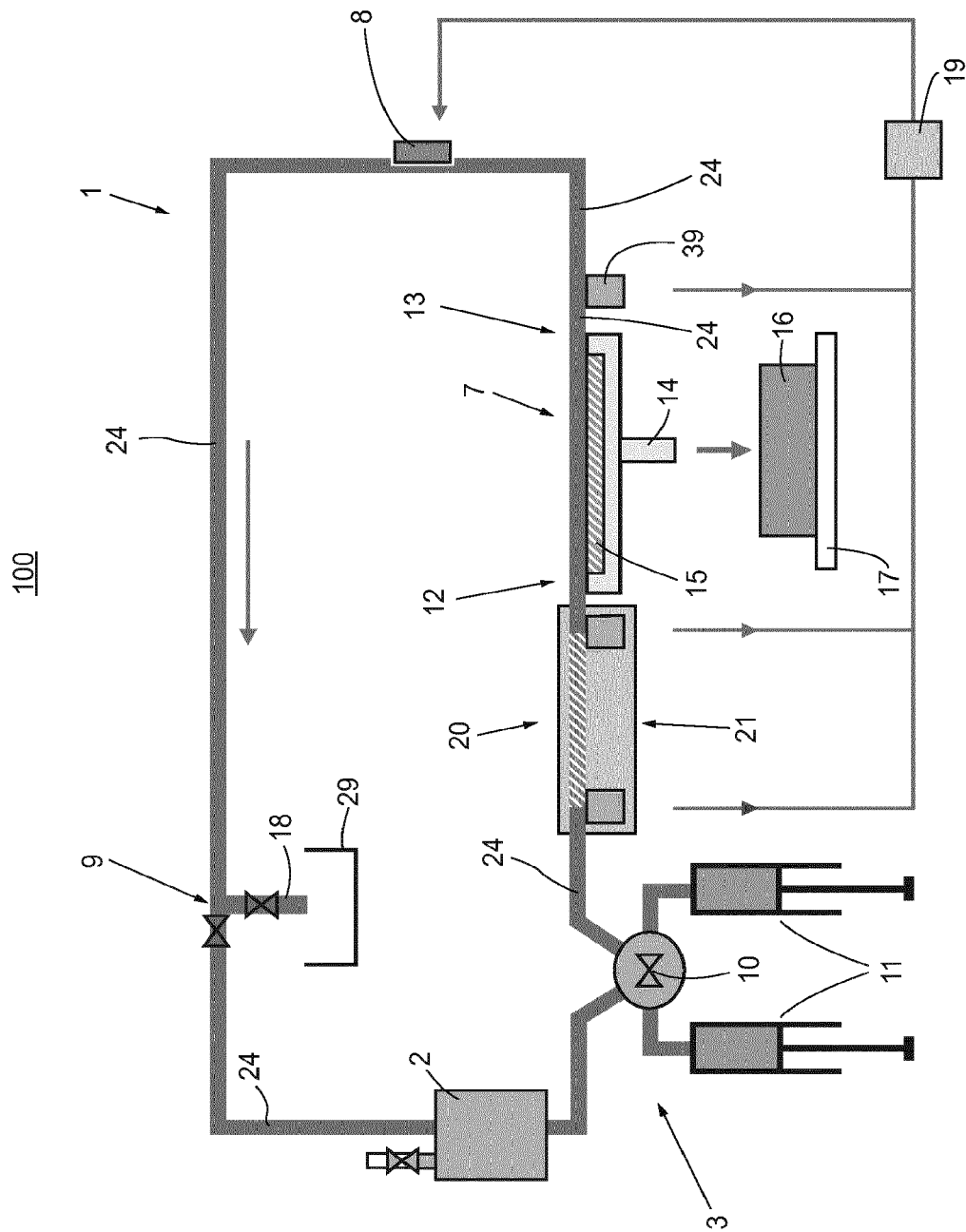
FIG. 2 shows a flow filtration circuitry according to the invention with an integrated microfluidic element.

FIG. 2 shows a micro fluid filtration system 100 according to the invention with a circuitry 1 for and by a plurality of conduits 24. The fluid circuitry 1 shown in FIG. 2 also comprises a reservoir 2, a pump 3 which is implemented by a 4-port-valve (valving apparatus) 10 and two syringes 11 that serve as a piston pump.

The micro tangential flow filtration element 7 comprises a feed inlet 12, a retentate outlet 13, a permeate outlet 14 and a semipermeable membrane 15. The membrane 15 is capable of separating the fluid sample into a retentate stream and a permeate stream upon passage of the fluid sample into the tangential flow filtration element 7 through the feed inlet 12. The permeate stream withdrawn from the circuitry 1 via the permeate outlet 14 is collected in a permeate chamber 16. The permeate chamber can be located on a balance 17 to weight the amount of the permeate stream and to control the flow through the membrane 15 and to measure the amount of withdrawn fluid. The retentate stream flows through conduit 24, through the reservoir 2, the valving apparatus 10, the integrated microfluidic element 20 into the TFF-element 7. This circuitry is called retentate circuitry in which the microfluidic element 20 is located.

The circuitry 1 according to the invention also comprises a valve 9 with a T-shaped conjunction and an outlet port 18. The outlet port 18 is used to withdraw fluid from the circuitry 1, particularly to withdraw the concentrated fluid at the end of the concentration process. The fluid is conducted to a collection reservoir 29.

The pressure regulator 8 is a regulator element for regulating the pressure (and thereby the fluid flow) in the fluid circuitry 1. The pressure regulator 8 is controlled by a control unit 19 which is fed by the pressure values measured within the circuitry 1. These pressure values are detected by pressure sensor 39 and at least one pressure sensor which is integrated within the integrated microfluidic element 20.

The integrated microfluidic element 20 defines a so-called volume element which is a separate and discrete element. The microfluidic element 20 has a volume in which fluid of the fluid circuitry is contained during its flow through the microfluidic element 20. The volume of element 20 is at most 25% of the working volume of the complete fluid circuitry 1. It could be shown that the microfluidic element 20 is one of the major elements of the fluid circuitry. Therefore, reducing its volume has a direct and positive influence to the complete fluid circuitry and its minimal working volume. So, preferably the working volume of the microfluidic element 20 is at most 20% of the minimal working volume, further preferably at most 15%. It can also be shown that the positive influence is increased if the volume of the microfluidic element 20 is at most 10% of the minimal working volume. During investigations within the frame of the invention positive effects of the volume of the volume element 20 have been determined if the volume of the microfluidic element 20 is at most 400 µl, preferably at most 50 µl. Nevertheless this allows processing of small fluid samples and in case of a concentration mode achieving high concentration rates.

The circuitry 1 comprises the integrated microfluidic element 20 instead of the separated elements of the pressure sensors and the cuvette (which has here the functionality of a capillary with a different diameter compared to the diameter of the conduits before and after the integrated pressure sensors, respectively) which are signed by the reference numbers 4, 5 and 6 respectively in FIG. 1. In the embodiment shown in FIG. 2 the integrated microfluidic element 20 is a viscosity module 21 capable to measure the viscosity of the fluid sample contained in the circuitry 1. The dimensions of the viscosity module 21 are significantly reduced with respect to the overall dimensions of the separated elements of two pressure sensors and a cuvette. An important role plays the fact that the conduits 24 between the elements can be shortened with so that the minimal working volume of the circuitry 1 can be reduced in total.

Figure 3:
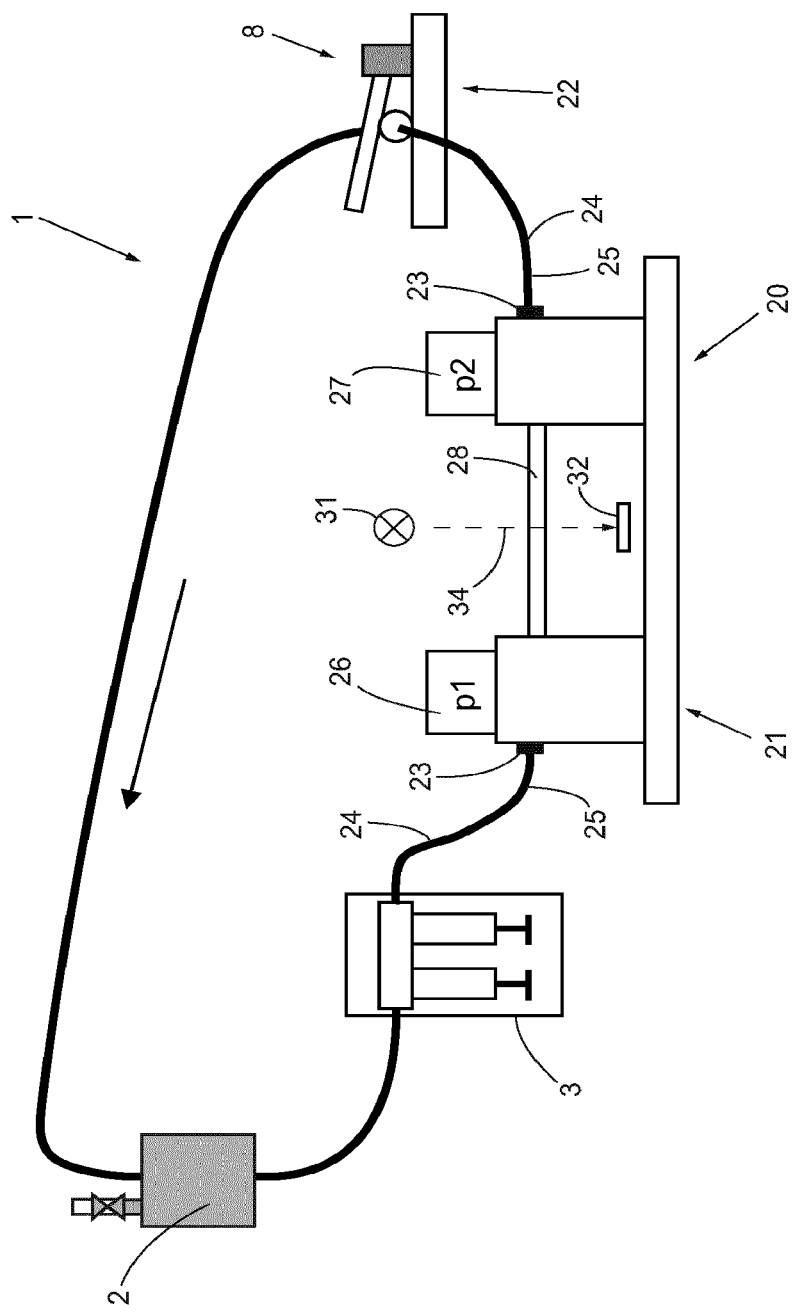
FIG. 3 shows another schematic view of a fluidic circuitry for the determination of viscosity according to the invention.

FIG. 3 shows a schematic principal view of a reduced circuitry 1 which comprises a reservoir 2, a pump 3, a pressure regulator 8 in form of a hose clamp 22 and a viscosity module 21 which is an integrated microfluidic element 20 or an microfluidic module. The microfluidic element 20 comprises the functionality of two pressure sensors and a cuvette. The viscosity module 21 further allows to determine the concentration and aggregation of compounds contained in the fluid sample by an optical measurement using the integrated transparent capillary 28 providing a cuvette function and to determine the viscosity by measuring a pressure gradient or difference using two pressure sensing elements, for example in form of pressure sensing modules 26, 27.

The viscosity module 21 shown in FIG. 3 has two tube fittings 23 for connecting to the conduits 24 which are tubes 25 in this example. Between the two pressure sensing modules 26, 27 the capillary 28 is arranged which is directly connected to the pressure sensing modules 26, 27.

The volume or minimal working volume of the viscosity module 21 is formed by the effective volume of (or in) the pressure sensing modules 26, 27 and by the effective volume of the capillary 28. To vary the volume of the viscosity module 21 (being the integrated microfluidic element 20) the volume of the capillary 28 or the volume of the fluidic connection to the pressure sensing modules 26 can be changed.

To reduce the minimal working volume of the viscosity module 21 and so also the minimal working volume of the circuitry 1 and to enable viscosity determination, the internal diameter of the capillary 28 is preferably in a range between 100 μm and 500 μm. Particularly preferred is an internal diameter of the capillary 28 between 100 ™ and 250 μm. The internal diameter is understood as the diameter of the capillary 28 if the capillary has a circular cross section. If the capillary is not round, the internal diameter is to be understood as the dimension which is parallel to the optical measurement direction (arrow 34). So, a radiation or light beam which is transmitted by a source 31 passes through the capillary 28 along the internal diameter and is received by an optical detector 32. The width of the capillary which is perpendicular to the optical measurement distance 34 is not relevant for the optical measurement (as long as it is not too small to allow the light beam to pass through the cuvette).

According to the invention the capillary 28 is preferably implemented in such a manner that the fluidic resistance of the capillary 28 and the fluidic length are adjusted in a way that establishes a pressure gradient along the capillary 28 which is substantially high. A pressure gradient or pressure difference is understood as substantially high if the pressure gradient along the capillary is at least in the range of approximately 0.05 bar per mPa sec (milli Pascal second).

Figure 4:
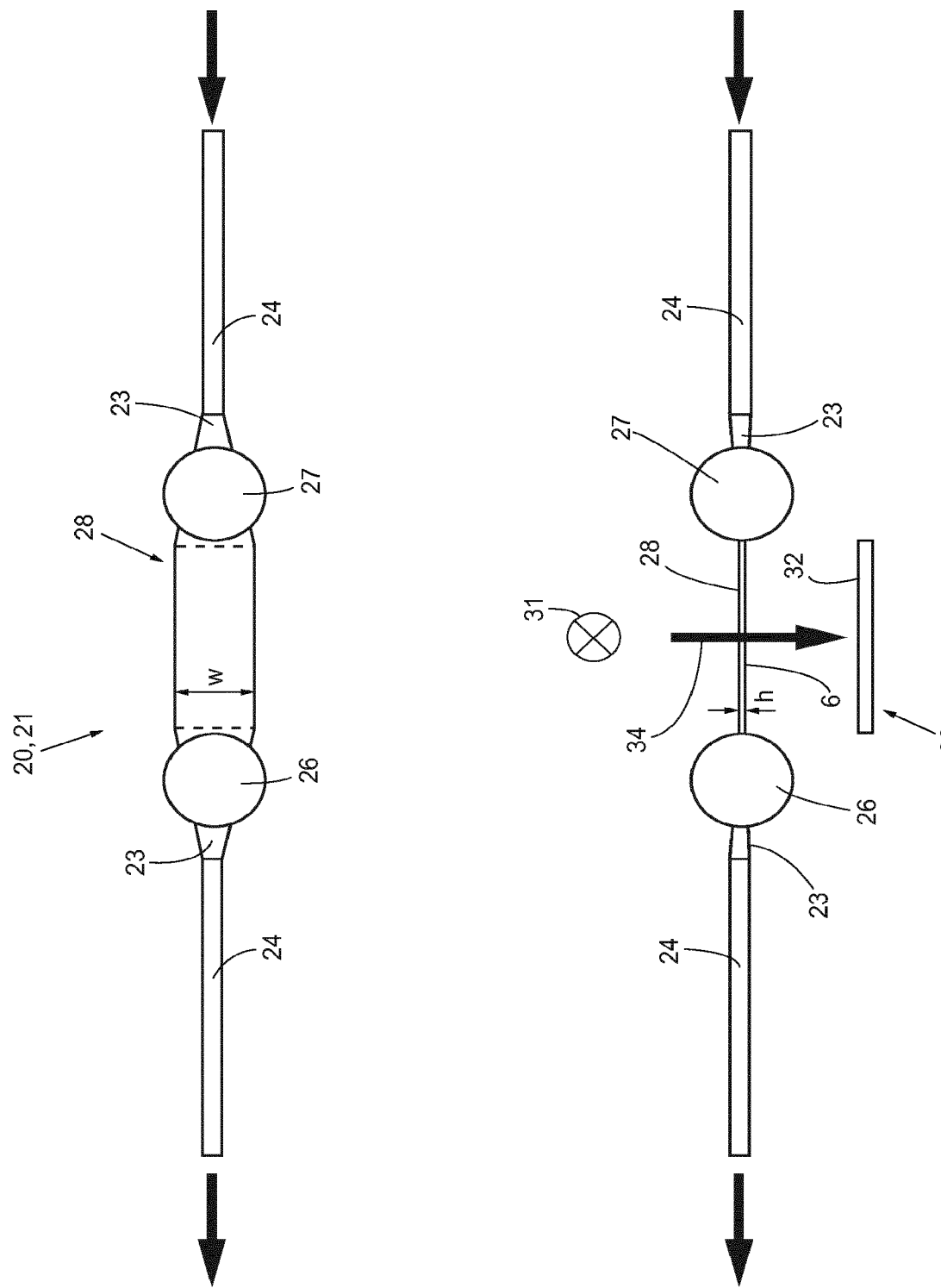
FIG. 4 shows an integrated microfluidic element comprising the functionality of two pressure sensors and a measuring element for detecting the concentration and viscosity.

FIG. 4 shows a detailed view of an integrated microfluidic element 20 according to the invention. The microfluidic element 20 is a viscosity module 21 which comprises the functions of two pressure sensing modules 26, 27 and the function of a cuvette 6 which is integrated as a capillary 28.

The upper picture in FIG. 4 shows a top view of the viscosity module 21. It is clearly shown that the width w of the transparent capillary 28 is wider than the width of the connecting conduits 24. This arrangement is used to calculate the viscosity on basis of measuring a pressure difference with the two pressure sensing modules 26, 27.

The lower picture of FIG. 4 shows a side view of the viscosity module 21. It is clearly shown that the height h of the cuvette element 6 (capillary 28) is smaller than the height of the connecting conduits 24 (which are preferably pipes) and the fittings 23 respectively. An optical measuring unit 30 comprises a light emitting source 31 arranged above the capillary 28. The light emitting source 31 can be every source emitting an electromagnetic radiation which can be for example visible light or invisible light like ultraviolet light. A respective optical detector 32 is arranged below the capillary 28, preferably below the viscosity module 21, so that a radiation transmitted from the optical source 31 along the optical measurement direction 34 passes through the transparent capillary 28 of the viscosity module 21 and reaches the detector 32. This allows an online, real-time monitoring of the concentration of components or aggregates contained in the solution which flows in an unidirectional manner through the circuitry 1 and the viscosity module 21.

The FIGS. 5a, b show two other embodiments of an integrated microfluidic element 40 which provides and contains the functionality of the tangential flow filtration element 7 and of the two pressure sensors 5 and 39 shown in FIG. 1 or FIG. 2, respectively.

The upper picture of FIG. 5a shows a schematic cross-sectional side view of the first embodiment of the integrated microfluidic element 40 which includes the functions of the flow filtration element 7 and of two pressure sensors 5, 39 according to FIG. 2. The integrated microfluidic element 40 comprises a housing 50 in which a capillary channel 44 is formed. The capillary channel also comprises the feed inlet 12, the retentate outlet 13 and the permeate outlet 14. The housing 50 of the microfluidic element 40 forms a TFF-housing 51 of the tangential flow filtration element 7. In a preferred embodiment the TFF-housing 51 can be part of the housing 50 of the microfluidic element 40. The integrated microfluidic element 40 comprises two pressure sensing modules 26, 27 each located at an end of the filtration element 41. The filtration element 41 comprises the feed inlet 12 followed by a filtration chamber 42 containing the membrane 15 which is located above a support structure 43. The membrane 15 is sealed by a sealing 45 so that fluid flowing through the permeate outlet 14 have to pass the membrane 15. Preferably the membrane 15 of the tangential flow filtration element 7 is disposable. So, in case of clogging or after a predetermined process time the efficiency of the membrane may be reduced. Then, only the membrane has to be exchanged. The TFF-element 7 and the microfluidic element 40 remain unchanged. Especially the connections to connecting conduits do not have to be exchanged or renewed. Additionally, replacing the membrane 15 only does not influence the pressure sensing modules 26, 27. Only the sealing 45 sealing the membrane 15 to the housing 50 will also be renewed.

The permeate outlet 14 of the filtration chamber 42 is located at the end of the chamber 42 which is essentially perpendicular to the flow direction. At the end of the chamber 42 also the retentate outlet 13 is positioned so that a part of a fluid flow through the filtration element 41 leaves the chamber at this end. In flow direction before and behind the filtration chamber 42 a channel 44 is implemented in the microfluidic element 40. In this channel 44 the two pressure sensing modules 26 and 27 respectively are arranged. So, the pressure difference between the two pressure sensing modules 26, 27 can be used to calculate the transmembrane pressure in the microfluidic element 40. The filtration chamber 42 can further be complemented with a turbulence promotor.

The lower picture in FIG. 5a shows a cross-sectional top view along the line A-A of the upper picture. It is clearly seen that the capillary channels 44 at the two ends of the microfluidic element are relatively small. In the area of the pressure sensing modules 26, 27 the capillary is widened. The filtration chamber 42 is further widened in respect to the capillary channel 44 and the sensing modules 26, 27. Between the sensing modules 26, 27 and the filtration chamber 42 the capillary channels have their (normal) width.

Figure 5B:
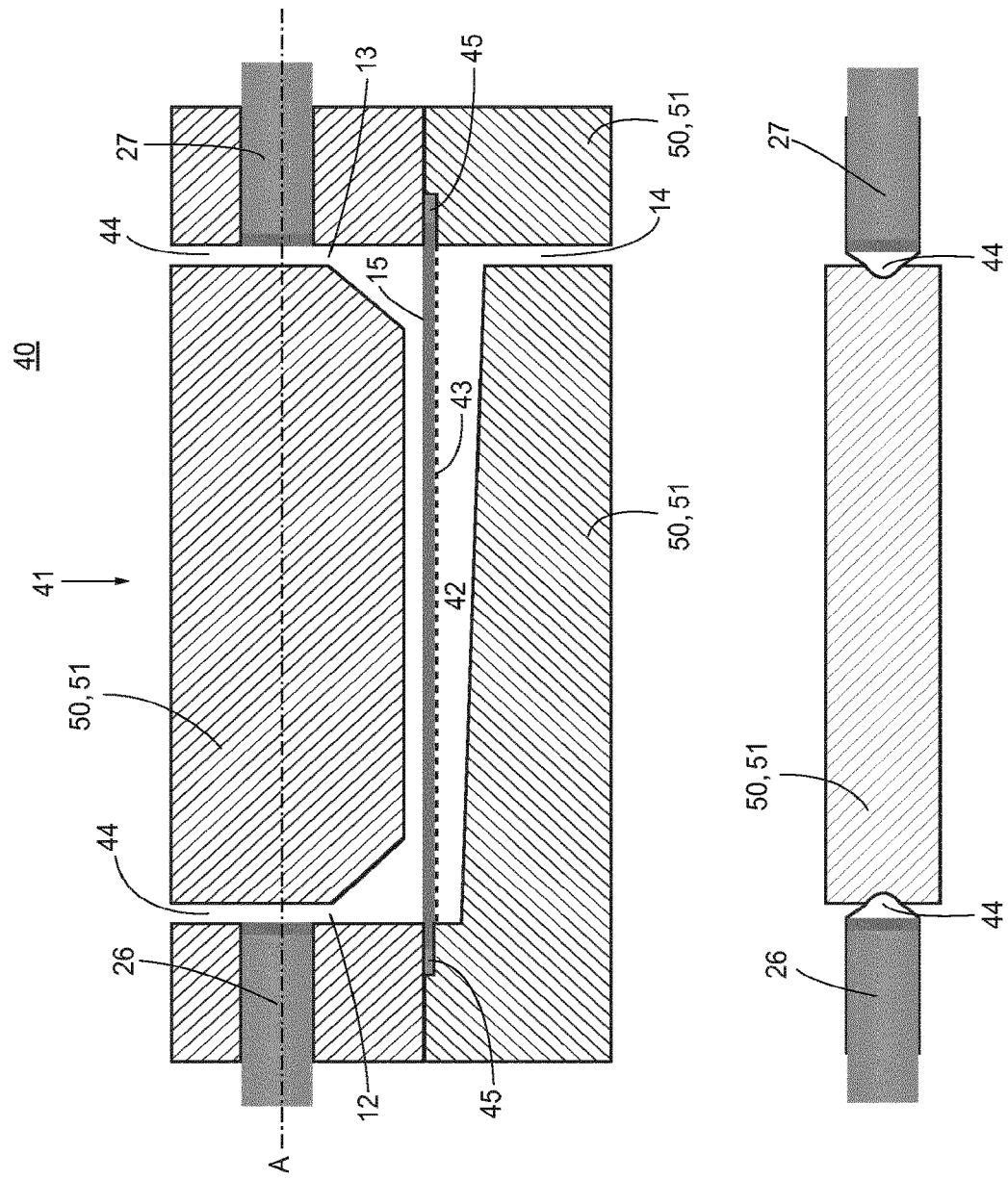

FIG. 5b shows another embodiment of an integrated microfluidic element 40 comprising a filtration element 41 and two pressure sensing modules 26, 27. The upper picture shows a cross sectional side view of the integrated microfluidic element 40; the lower picture shows a cross-sectional top view along the line A-A. The difference between the two embodiments in the FIGS. 5a and 5b is that in the embodiment shown in FIG. 5b the feed inlet 12 and the retentate outlet 13 are located at the upper side of the microfluidic element 40. So, the flow is deflected two times during passage of the microfluidic element 40. The pressure sensing modules 26 and 27 are located at the feed inlet 12 and at the retentate outlet 13, respectively, so that the pressure of the fluid is measured before and after the fluid passes the filtration chamber 42.

The construction of the filtration element 41 of FIG. 5b itself is similar to the construction of the filtration element 41 according to FIG. 5a with respect to the arrangement of the membrane 15 and the permeate outlet 14. The cross sectional top view clearly shows that the capillary channel 44 is also widened in the area of the pressure sensing module 26, 27.

The two embodiments of the microfluidic element 40 shown in the FIGS. 5a and 5b have the advantage that the construction of the element is cheap and easy to perform. Due to the fact that only small pieces have to be arranged together, the pieces can be manufactured with a high accuracy so that very small volumes of the filtration chamber 42 can be achieved. Further, due to the not needed fittings and conduits between the filtration element 41 and the pressure sensing modules 26, 27 the minimal working volume can be reduced further.

So, using these alternative embodiments of an integrated microfluidic element or module 40, which contains at least two functionalities of the elements comprised in a fluidic circuitry, especially for concentration or purification of components contained within the fluid sample within this circuitry, allows to reduce the minimal working volume of the circuitry 1. Merging the functionality of at least two circuitry elements results in a compact component or module with a small and reduced minimal working volume that is optimized for concentrating small amounts of fluid, preferably of less than 20 ml.

The invention claimed is:

1. A microfluidic flow filtration system having a recirculation loop fluid circuitry, the recirculation loop fluid circuitry comprising the following elements and connecting the following elements to each other:
   a tangential flow filtration element having a feed inlet, a retentate outlet, a permeate outlet and a membrane that separates a fluid sample into a retentate stream and a permeate stream upon passage of the fluid sample into the tangential flow filtration element through the feed inlet,
   a pumping element that creates and drives a fluid flow of the fluid sample through the fluid circuitry and the tangential flow filtration element, wherein the retentate outlet is connected to an inlet of the pumping element,
   at least two obtaining elements that obtain information about the properties of the fluid sample within the fluid circuitry, wherein an inlet of the obtaining element is connected to an outlet of the pumping element and an outlet of the obtaining element is connected to the feed inlet of the tangential flow filtration element; and
   a plurality of conduits connecting the elements of the microfluidic flow filtration system;
   wherein
   a minimal working volume of the fluid circuitry is defined by a minimal fluid volume retained in the pumping element, the at least two obtaining elements and the plurality of conduits, such that the fluid can be recirculated in the fluid circuitry without pumping air through the fluid circuitry is at most 5 ml,
   the at least two obtaining elements are implemented into one integrated microfluidic element,
   the one integrated microfluidic element has a volume which is at most one fourth of the minimal working volume of the fluid circuitry,
   one obtaining element of the at least two obtaining elements is an optical measuring element that determines a concentration of components contained in the fluid sample, wherein said optical measuring element includes a cuvette having a height smaller than a height of connecting conduits and a width wider than a width of connecting conduits, and
   one obtaining element of the at least two obtaining elements is a physical measuring element that determines a viscosity of the fluid sample, wherein said physical measuring element includes two pressure sensors arranged upstream and downstream of the cuvette for measuring a pressure difference.

2. The microfluidic flow filtration system according to claim 1, wherein the integrated microfluidic element has a housing and the tangential flow filtration element has a TFF-housing which is part of the housing of the microfluidic element.

3. The microfluidic flow filtration system according to claim 2, wherein the membrane of the tangential flow filtration element is disposable.

4. The microfluidic flow filtration system according to claim 1, wherein the circuitry further comprises a reservoir suitable for containing the fluid sample, the reservoir being integrated in the fluid circuitry and having at least a reservoir inlet and a reservoir outlet both in connection to the circuitry.

5. The microfluidic flow filtration system according to claim 3, wherein a volume of the reservoir is at most 10 ml.

6. The microfluidic flow filtration system according to claim 3, wherein the volume of the reservoir is at most 1 ml.

7. The microfluidic flow filtration system according to claim 3, wherein the volume of the reservoir is at most 0.7 ml.

8. The microfluidic flow filtration system according to claim 3, wherein the volume of the reservoir is at most 0.5 ml.

9. The microfluidic flow filtration system according to claim 1, wherein the circuitry further comprises
   at least one valve element; and/or
   a hollow fiber element; and/or
   a regulator element that regulates the flow of the fluid through the fluid circuitry, and/or
   a pressure regulation element that regulates the pressure of the fluid in the fluid circuitry, and/or
   a determining element that determines pressure data which is one or more pressure sensors; and/or
   an optical detection element.

10. The microfluidic flow filtration system according to claim 1, wherein the minimal working volume of the fluid circuitry is at most 1 ml.

11. The microfluidic flow filtration system according to claim 1, wherein the minimal working volume of the fluid circuitry is at most 500 µl.

12. The microfluidic flow filtration system according to claim 1, wherein the minimal working volume of the fluid circuitry is at most 200 µl.

13. The microfluidic flow filtration system according to claim 1, wherein the minimal working volume of the fluid circuitry is at most 100 µl.

14. The microfluidic flow filtration system according to claim 1, wherein the conduits have an internal diameter of at most 1.5 mm.

15. The microfluidic flow filtration system according to claim 1, wherein the conduits have an internal diameter of at most 1 mm.

16. The microfluidic flow filtration system according to claim 1, wherein the conduits have an internal diameter of at most 0.7 mm.

17. The microfluidic flow filtration system according to claim 1, wherein the conduits have an internal diameter of at most 0.1 mm.

18. The microfluidic flow filtration system according to claim 1, wherein a conduit is a channel, a passage in an element of the circuitry, a pipe, or a tubing.

19. An integrated microfluidic element for a microfluidic flow filtration system with a fluid circuitry having a minimal working volume of at most 5 ml, wherein the integrated microfluidic element has a volume which is at most one fourth of the minimal working volume of a fluid circuitry of the micro flow filtration system, and provides the functionality of at least two obtaining elements for obtaining information about the properties of a fluid sample within the circuitry, wherein one obtaining element of the at least two obtaining elements is an optical measuring element that determines a concentration of components contained in the fluid sample, wherein said optical measuring element includes a cuvette having a height smaller than a height of connecting conduits and a width wider that a width of connecting conduits, and one obtaining element of the at least two obtaining elements is a physical measuring element that determines a viscosity of the fluid sample, wherein said physical measuring element includes two pressure sensors arranged upstream and downstream of the cuvette for measuring a pressure difference.

20. The integrated microfluidic element according to claim 19, comprising the functionality of a tangential flow filtration element having a feed inlet, a retentate outlet, a permeate outlet and a membrane that separates a fluid sample into a retentate stream and a permeate stream upon passage of the fluid sample into the tangential flow filtration element through the feed inlet.

21. The integrated microfluidic element according to claim 19, comprising a capillary or capillary channel.

* * * * *